April 2, 1974  D. ZIMMERMAN  3,801,692

PRODUCTION OF NOVEL OPEN-CELLED MICROPOROUS FILM

Filed Nov. 13, 1969

INVENTOR.
Daniel Zimmerman
BY  C. B. Barris
ATTORNEY

United States Patent Office 3,801,692
Patented Apr. 2, 1974

3,801,692
PRODUCTION OF NOVEL OPEN-CELLED MICROPOROUS FILM
Daniel Zimmerman, East Brunswick, N.J., assignor to Celanese Corporation, New York, N.Y.
Filed Nov. 13, 1969, Ser. No. 876,425
Int. Cl. D01d 5/12
U.S. Cl. 264—210 R    9 Claims

ABSTRACT OF THE DISCLOSURE

The novel process for making the open-celled microporous film involves the consecutive steps of cold stretching at a temperature below 0° C., for example −10° C. to −40° C., hot stretching, and heat setting a non-porous, crystalline, elastic film. The resulting open-celled microporous film has a greater number of pores, a more uniform pore concentration or distribution, a larger total pore area, and better thermal stability than microporous films of the prior art.

BACKGROUND OF THE INVENTION

Field of the invention

The present invention relates to a novel process for producing open-celled microporous films from synthetic resins or polymers. More particularly, the present invention relates to a novel process for producing open-celled microporous films evidencing improved porosity, i.e. a greater number of pores.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films produced by the process of the present invention are of the latter type.

Further, the porous films resulting from the present invention are microscopic, i.e., the details of their pore configuration or arrangement are discernible only by microscopic examination. In fact, the open cells or pores in the films are smaller than those which can be measured using an ordinary light microscope, because the wavelength of visible light, which is about 5,000 angstroms (an angstrom is one ten-billionth of a meter), is longer than the longest planar or surface dimension of the open cell or pore. Said microporous films may be identified however, by using electron microscopy techniques which are capable of resolving details of pore structure below 5,000 angstroms.

The present process produces microporous films which are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross volume is determined by immersing a known weight of the film in a vessel partly filled with mercury at 25° C. and atmospheric pressure. The volumetric rise in the level of mercury is a direct measure of the gross volume. This method is known as the mercury volumenometer method, and is described in the Encyclopedia of Chemical Technology, vol. 4, p. 892 (Interscience, 1949).

SUMMARY OF THE PRIOR ART

Heretofore, films have been prepared from synthetic resins or polymers, e.g., polypropylene, by various melt extrusion or casting methods. Such films have many desirable properties such as high strength, and resistance to heat, light, and various chemicals.

For specific applications such as filter media and backings for breathable medical dressings or bandages, however, films having a porous structure in addition to their other properties are necessary or highly desirable.

Porous films have been produced which possess a microporous, open-celled structure, and which are also characterized by a reduced bulk density. Films possessing this microporous structure are described, for example, in U.S. Pat. 3,426,754, which patent is assigned to the assignee of the present invention. The preferred method of preparation described therein involves drawing or stretching at ambient temperatures, i.e., "cold drawing," a crystalline, elastic starting films in an amount of about 10 to 300% of its original length, with subsequent stabilization by heat setting of the drawn film under a tension such that the film is not free to shrink or can shrink only to a limited extent.

While the above described microporous or void-containing film of the prior art is useful, the search has continued for new processes able to produce open-celled microporous films having a greater number of pores, a more uniform pore concentration or distribution, a larger total pore area, and the ability to consistently reproduce films having these desired properties. Such properties are significant in applications such as filter media where a large number of uniformly distributed pores are necessary or highly desirable and where consistent reproduction of properties is essential.

SUMMARY OF THE INVENTION

Accordingly, an object of the present invention is to provide novel processes for consistently producing microporous polymer films having improved porosity, i.e., a greater number of pores so as to prevent or substantially alleviate the limitations or disadvantages of known porous or voidy polymer films described above.

Other and further objects of the present invention will be apparent to those skilled in the art from the following:

In accordance with the present invention, processes are provided for preparing open-celled microporous polymer films from nonporous, crystalline, elastic polymer starting films. The process steps include (1) cold stretching, i.e., cold drawing, the elastic film at temperatures at or below about 0° C. until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat setting the resulting porous film under tension, i.e., at substantially constant length, to impart stability to the film.

The elastic starting film is preferably made from crystalline polymers such as polypropylene or oxymethylene polymers by melt extruding the polymer into a film, taking up the extrudate at a drawdown ratio giving an oriented film, and thereafter heating or annealing the oriented film if necessary to improve or enhance the initial crystallinity.

The essence of the present invention is the discovery that cold stretching, i.e., cold drawing, at temperatures below those heretofore contemplated, i.e. below 0° C., imparts to the elastic film a unique open-celled structure which results in advantageous properties, including improved porosity.

As determined by various morphological techniques or tests such as electron microscopy, the microporous films produced by the present invention are characterized by a plurality of elongated, nonporous, interconnecting surface regions or areas which have their axes of elongation substantially parallel. Substantially alternating with and defined by these nonporous surface regions are a plurality of elongated, porous surface regions which contain a plurality of parallel fibrils or fibrous threads. These fibrils are connected at each of their ends to the nonporous regions, and are substantially perpendicular to them. Between the fibrils are the pores or open cells of the films of the present invention. These surface pores or open cells are substantially interconnected through tortuous paths or passageways which extend from one surface region to another surface area or region.

With such a defined or organized morphological structure, the films produced herein may have a greater proportion of surface area that the pores cover, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

Other aspects and advantages of the present invention will become apparent to one skilled in the art to which the present invention pertains from the following more detailed description of preferred embodiments when read in conjunction with the appended drawings.

DESCRIPTION OF THE PREFERRED EMBODIMENTS

Figure 1:
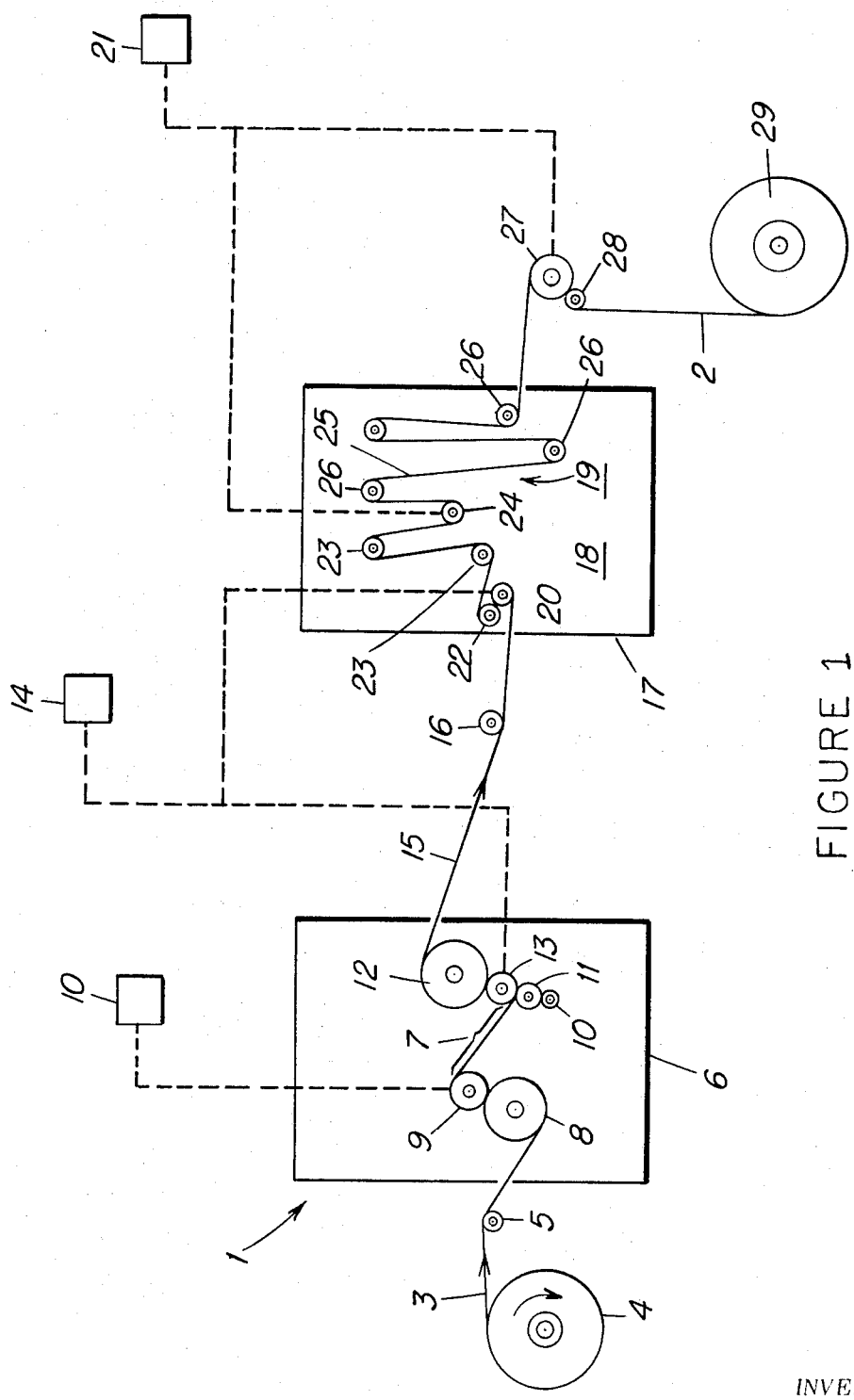
FIG. 1 schematically illustrates apparatus suitable for carrying out the process of the present invention.

The process of the present invention utilizes a starting elastic film of crystalline, film-forming, polymers. These elastic films have an elastic recovery at zero recovery time (hereinafter defined) when subjected to a standard strain (extension) of 50 percent at 25° C. and 65 percent relative humidity of at least about 40 percent, preferably at least about 50 percent, and most preferably at least about 80 percent.

Elastic recovery as used herein is a measure of the ability of a structure or shaped article such as a film to return to its original size after being stretched, and may be calculated as follows:

Elastic Recovery (ER), percent $$= \frac{\text{(Length when stretched)} - \text{(length after stretching)}}{\text{Length added when stretched}} \times 100$$

Stated another way, elastic recovery provides a measure of conformance with the Hooke's law portion of a stress-strain curve.

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent, and most preferably at least 50 percent, e.g., about 50 to 90 percent, or more. Percent crystallinity is determined by the X-ray method described by R. G. Quynn et al. in the Journal of Applied Polymer Science, vol. 2, No. 5, pp. 166–172 (1959). For a detailed discussion of crystallinity and its significance in polymers, see Polymers and Resins, Golding (D. Van Nostrand, 1959).

Preferred suitable starting elastic films, as well as the preparation thereof, are further defined in copending application Ser. No. 572,601, filed Aug. 15, 1966, Wissbrun and Bierenbaum, inventors, and assigned to the same assignee as the present invention.

Other elastic films which may be suitable for the practice of the present invention are described in British Pat. 1,052,550, published Dec. 21, 1966.

The starting elastic film utilized in the process of the present invention should be differentiated from films formed from classical elastomers such as the natural and synthetic rubbers. With such classical elastomers the stress-strain behavior, and particularly the stress-temperature relationship, is governed by entropy-mechanism of deformation (rubber elasticity).

A significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of films should generally have a percent crystallinity of at least 20 percent, preferably at least 30 percent, and most preferably about 50 percent to 90 percent, or higher.

For example, a film-forming homopolymer of polypropylene may be employed. When propylene homopolymers are contemplated, it is preferred to employ an isotactic polypropylene having a percent crystallinity as indicated above, a weight average molecular weight ranging from about 100,000 to 750,000, preferably about 200,000 to 500,000 and a melt index (ASTM–1958D–1238–57T, part 9, p. 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, i.e., one which contains recurring oxymethylene, i.e.,

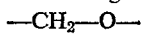

—CH$_2$—O— units interspersed with —OR— groups in the main polymer chain where R is a divalent radical containing at least two carbon atoms directly linked to each other and positioned in the chain between the two valences, with any substituents on said R radical being inert, that is, those which do not include interfering, functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. 3,027,352 of Walling et al. These polymers in film form may also have a crystallinity of at least 20 percent, preferably at least 30 percent and most preferably at least 50 percent, e.g., 50 to 60 percent, or higher. Further, these polymers have a melting point of at least 150° C. and a number average molecular weight of at least 10,000. For a more detailed discussion of acetal and oxymethylene polymers, see Formaldehyde, Walker, pp. 175–191 (Reinhold, 1964).

Other relatively crystalline polymers to which the invention may be applied with some or little process modification are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and need not be described further herein for sake of brevity.

The types of apparatus suitable for forming the starting elastic films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils.

Using this type of apparatus, film may be extruded at a drawdown ratio of about 20:1 to 200:1, preferably 50:1 to 150:1.

The terms "drawdown ratio" or, more simply, "draw ratio," as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C., preferably 200° C. to 240° C. Polyethylene may be extruded at a melt temperature of about 175° to 225° C. while acetal polymers, e.g., those of the type disclosed in U.S. Pat. 3,027,352, may be extruded at a melt temperature of about 185° C. to 235° C., preferably 195° to 215° C.

The extrusion operation is preferably carried out with rapid cooling and rapid drawdown in order to obtain maximum elasticity. This may be accomplished by having the take-up roll relatively colse to the extrusion slot, e.g., within two inches and, preferably, within one inch. An "air knife" operating at temperatures between, for example 0° C. and 40° C., may be employed within one inch of the slot to quench, i.e., quickly cool and solidify, the film. The take-up roll may be rotated, for example, at a speed of 10 to 1000 ft./min., perferably 50 to 500 ft./min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide quick and effective cooling. Means such as a cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the $D_2/D_1$ ratio, for example, 0.5 to 6.0 and preferably about 1.0 to about 2.5, and the take-up speed, for example, 30 to 700 ft./min. The melt temperature may be within the ranges given previously for straight slot extrusion.

The extruded film may then be initially heat treated or annealed in order to improve crystal structure, e.g., by increasing the size of the crystallites and removing imperfections therein. Generally, this annealing is carried out at a temperature in the range of about 5° C. to 100° C. below the melting point of the polymer for a period of a few seconds to several hours, e.g., 5 seconds to 24 hours, and preferably from about 30 seconds to 2 hours. For polypropylene the preferred annealing temperature is about 100 to 155° C., while for oxymethylene (acetal) copolymers, the preferred annealing temperature is about 110 to 165° C.

An exemplary method of carrying out the annealing is by placing the extruded film in a tensioned or tensionless state in an oven at the desired temperature in which case the residence time is preferably in the range of about 30 seconds to 1 hour.

In accordance with the present invention, the film is subjected to a cold stretching operation. The term "cold stretching" as used herein is defined as stretching or drawing a film to greater than its original length and at a stretching temperature, i.e., the temperature of the film being stretched, at or less than 0° C. The lower limit of the temperature range at which the film may be stretched or drawn is defined by the physical characteristics of the polymer film per se, apparatus utilized, etc. Essentially, the lowest temperature at which the film may be stretched or drawn is that at which it breaks because of brittleness or other physical phenomena caused by the low temperature rather than because of stretching past elastic limit of the polymer film.

While not wishing to be restricted to any particular theory, it is believed that the optimum temperature at which olefin polymer film may be cold stretched is the second order transition temperature of the polymer from which the film is formed. As used herein, the term "second order transition temperature" is defined as the smaller, as compared with the main or primary glass transition due to motion of large segments of the polymer chain, evidenced at lower temperatures and contributed to motion of side groups or to small segments of the main polymer chain. They are easily measured by mechanical damping tests.

Typical second order transition temperatures are polyethylene —21° C., isotactic polypropylene, —18, —35; etc.

While the optimum cold stretching temperature varies with the type of polymer, molecular weight distribution of the polymer, crystalline morphology of the film etc., it is found that because of the economics of providing extremely low temperatures, limitations of equipment, film breakage, etc. that the preferred range of stretching or drawing is from about —10° C. to about —40° C.

The term "hot stretching" as used herein is defined as stretching above the temperature at which melting begins when the film is uniformly heated from a temperature of 25° C. and at a rate of 20° C. per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins also varies with the type of polymer, the molecular weight distribution of the polymer, and the crystalline morphology of the film. For example, polypropylene elastic film may be hot stretched at a temperature above about 120° C. and below the fusion temperature, and preferably between about 130° and about 150° C. Again, the temperature of the film itself being stretched is referred to herein as the stretch temperature. The stretching in these two steps or stages must be consecutive, in the same direction, and in that order, i.e., cold then hot, but may be done in a continuous, semicontinuous, or batch process, as long as the cold stretched film is not allowed to shrink to any significant degree, e.g., less than 5 percent of its cold stretched length, before being hot stretched.

The sum total amount of stretching in the above two steps may be in the range of about 10 to 300 percent and preferably about 50 to 150 percent, based on the initial length of the elastic film. Further, the ratio of the amount of hot stretching to the sum total amount of stretching or drawing may be from above about 0.10:1 to below about 0.99:1, preferably from about 0.50:1 to 0.97:1, and most preferably from about 0.60:1 to 0.95:1. This relationship between the "cold" and "hot" stretching is referred to herein as the "extension ratio" (percent "hot" extension to the percent "total" extension).

In any stretching operation where cooling must be effected, the film may be cooled by contact with chilled rolls, by passage through a chilled liquid or gas, or the like. For example the film may be cooled by passage through refrigerated air, i.e., a cooling box is passed over or between hollow rolls which are maintained at the desired temperature by passage of a coolant therethrough.

In any stretching operation where heat must be supplied, the film may be heated by heat supplied by the moving rolls which may in turn be heated by an electrical resistance method, by passage over a heated plate, through a heated liquid, a heated gas, or the like.

After the above-described two stage or two step stretching, the stretched film is heat set. This heat treatment may be carried out at a temperature in the range from about 125° C. up to less than fusion temperature, and preferably about 130 to 150° C. for polypropylene; from about 80° C. up to less than fusion temperature and preferably about 140 to 160° C. for acetal polymers; from about 75° C. up to less than fusion temperature, and preferably about 115 to 130° C., for polyethylene, and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out sequentially with and after the drawing operation, should be longer than about 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

FIG. 1 shows a schematic diagram of exemplary continuous apparatus 1 suitable for production according to the present invention of microporous film 2 from an elastic starting film 3. The elastic film 3 from a supply or feed roll 4 is fed over an idler roll 5 into a refrigerated box 6 which cools the cold stretching zone 7. The cold stretching apparatus comprises a nip roll 8 cooperating with a first cold stretch roll 9 which is driven at a peripheral speed $S_1$ by suitable driving means 10, and two nip rolls 11 and 12 which cooperate with a second cold stretch roll 13 which is driven at a peripheral speed $S_2$, which is greater than $S_1$, by a suitable driving means 14. The elastic film 3 is thereby cold stretched at a cold stretch ratio of $S_2/S_1$. The cold stretched film 15 is then fed over an idler roll 16 into an oven 17 which provides heat for both the hot stretching zone 18 and the heat setting zone 19. The hot stretching apparatus comprises a hot stretch roll 20 driven by suitable means 21 at a peripheral speed $S_3$, which is about the same or slightly, e.g., less 10 percent, greater than $S_2$, to prevent relaxation of the cold stretched film 15. The hot stretch roll 20 cooperates with nip roll 22 so as to provide sufficient frictional engagement. Idler rolls 23 may be provided to achieve desired residence time in the oven and yet minimize necessary oven capacity. A second hot stretch roll 24 also is driven by driving means 21 at a peripheral speed $S_4$, which is greater than $S_3$. The cold stretched film 16 is thereby hot stretched at a hot stretch ratio of $S_4/S_3$. The cold stretched-hot stretched film 25 is passed around idler rolls 26 to achieve sufficient residence time for heat setting, and is then passed about a take-up roll 27 and a nip roll 28 and collected on a conventional take-up roll 29. The take-up roll 27 is also driven by driving means 21 at about the same speed as hot stretch roll 24 so as to maintain the film in tension during heat setting.

The microporous films of the present invention, in a tensionless state, have a bulk density lower than the density of the polymeric starting elastic material from which it is formed, which is usually no greater than 95 percent and preferably about 50 to 75 percent of the density of the elastic starting material.

Elastic recovery $$=\frac{\text{Total length when extended} - \text{Final distance between jaws}}{\text{Length added when extended}} \times 100\%$$

The other properties mentioned were determined with a standard ASTM method as follows:

Tensile strength: ASTM #D882—Method A (sample width 15 mm.)

Breaking elongation: ASTM #D882—Method A (sample width 15 mm.)

Modulus: ASTM #D882—Method A (sample width 1 inch)

Haze: ASTM #D1003—Procedure A as per FIG. 2.

Further, polypropylene microporous film of the present invention exhibits water vapor transmittance as high as 1600, generally 500 to 1400, the units of transmittance being given in cc./24 hours-m.$^2$-atm., the method of determining transmittance being ASTM 96–63T (Procedure B).

EXAMPLE I

Crystalline polypropylene having a melt index of 0.6 and a density of 0.92 is melt extruded at 225° C. through a 4 inch die having an opening of 0.04 inch. The hot diameter annular tube thus formed is expanded 1.2 times by internal air pressure and cooled by an air stream impinging on the film from an air ring located around and above the die. The extrusion is accomplished with an extruder of 24:1 length to diameter ratio and a shallow channel metering screw. The extrudate is drawn down to a drawdown ratio of 75:1 and passed through a series of rollers which collapses the tube. The film produced in this fashion is found to have the following properties: thickness, 1 mil; recovery from 50 percent elongation at 25° C., 50 percent; crystallinity about 60 percent.

A sample of this film is oven annealed with air with a slight tension at 140° C. for about 10 minutes, removed from the oven and allowed to cool. It was found to have the following properties: recovery from a 50 percent elongation at 25° C., 90 percent; crystallinity about 70 percent.

Samples of the annealed elastic film are then subjected to cold stretching procedures as shown in Table I, the hot drawing procedure is conducted at 140° C. The cold stretching is 10%, the hot stretching is 90% and the total draw is 100 percent, based on the original length of the elastic film. The film was thereafter heat set under tension, i.e. at constant length, at 140° C. for 10 minutes in air. Nitrogen flux at 65° C. is determined at various intervals, and the results are summarized in Table I.

The value of nitrogen flux referred to are calculated as follows:

A film having a standard surface area of 6.5 cm.$^2$ is mounted in a standard membrane cell having a standard volume of 64 cm.$^3$, and the cell is pressurized to a standard differential pressure (the pressure drop across the film) of 200 p.s.i. with nitrogen. The supply of nitrogen is then closed off and the time required for the pressure to drop to a final differential pressure of 150 p.s.i. as the nitrogen permeates through the film is measured with a stop watch. The nitrogen flux, Q, in g.-mol/cm.$^2$-min., is then determined from the equation $$Q = \frac{6.7 \times 10^1}{\Delta t \times T}$$

$\Delta t$ = elapsed time (in seconds)
$T$ = temperature of nitrogen (in °K.)
which is derived from the gas law, $PV=ZnRT$.

TABLE I

Nitrogen flux (g. mole/cm.$^2$ min. ×10$^3$) of microporous polypropylene film at 65° C.

| Cold stretching procedure | Run number | | | |
|---|---|---|---|---|
|  | 1 | 2 | 3 | 4 |
| 10% stretch at room temperature (20° C.) | 44 | 19 | 13 | 49 |
| 10% stretch at −26° C | 79 | 80 | 87 | 74 |

As can be seen from Table I, optimum flux is obtained when the film is cold stretched at a temperature below 0 degrees i.e., −26° C. rather than at room temperature. Further, the advantages of the present invention can be illustrated by comparison of the consistency of the resulting porosities. Thus, the film produced by the process of the present invention are not only more porous but surprisingly more uniform with little of the porosity fluctuation exhibited by the film cold stretched at room temperature.

EXAMPLE II

Example I is repeated except the melt index of the polypropylene is 3.6 and the extrusion temperature is 190° C. The thickness of the film produced is 1.5 mil. The effect on the rate of nitrogen flux is shown in Table II.

As can be seen from Table II, higher flux values are obtained using cold stretching steps at temperatures below 0° C., i.e., −26° C.

TABLE II

Nitrogen flux (g. mole/cm.$^2$ min. ×10$^3$) of microporous polypropylene film at 65° C.

| Cold stretching procedure | Run number | | | |
|---|---|---|---|---|
|  | 1 | 2 | 3 | 4 |
| 10% stretch at room temperature | 29 | 22 | 50 | 35 |
| 10% stretch at −26° C | 60 | 58 | 62 | 56 |

EXAMPLE III

Example II is repeated except that a polypropylene having a melt index of 1.0 is utilized. The thickness of the film is also 1.5 mil.

Table III evidences a similar effect on the rate of nitrogen flux and on porosity fluctuations.

TABLE III

Nitrogen flux (g. mole/cm.$^2$ min. ×10$^3$) of microporous polypropylene film at 65° C.

| Cold stretching procedure | Run number | | | |
|---|---|---|---|---|
|  | 1 | 2 | 3 | 4 |
| 10% stretch at room temperature | 10 | 15 | None |  |
| 10% stretch at −26° C | 17 | 13 | 21 |  |

EXAMPLE IV

Polypropylene similar to that employed in Example III was extruded in a manner similar to that of Example I. Samples were subjected to "conventional" stretching procedure, i.e., 10% "cold" stretch at room temperature, 90% "hot" stretch at 140° C. and also to the stretching procedure contemplated by this invention, i.e. 10% "cold" stretch at −40° C., 90% "hot" stretch at 140° C. The porosity of the product film after heat setting was measured; the 1 mil. film resulting from the "conventional" stretching procedure was not as porous (as indicated by nitrogen flux) as the film resulting from the instant stretching procedure.

EXAMPLE V

A copolymer of trioxane and about 2 weight percent, based on the weight of the polymer, of ethylene oxide of the type described in U.S. Pat. 3,027,352 which is after treated to remove unstable groups as described in U.S. Pat. 3,219,623, and which has a melt index of 2.5.

The above-described polymer is melt extruded at 198° C. through an 8 inch slit of the coat hanger type using a 1 inch extruder with a shallow channel metering screw. The length to diameter ratio of the extruder barrel was 24:1. The extrudate is drawn down to a drawdown ratio of about 150:1, contacted with a rotating casting roll maintained at about 145° C., and about one-quarter inch from the lip of the die. The film produced in this matter is wound up and found to have the following properties: thickness 5 mil., recovery from 50 percent strain about 45 percent. The polymer is then over annealed in the tensionless state at 145° C. for 16 hours. At the end of the annealing period it is removed from the oven, allowed to cool and found to have the following properties: thickness 5 mil., recovery from 50 percent elongation about 90 percent.

The film is cold stretched at 10° C. to 10 percent of its original length, and thereafter stretched at 130° C. to a total extension of 100 percent of its original length, and thereafter heat set at constant length in an oven at 140° C. for 2 minutes. At the end of this period it is removed from the oven, allowed to cool and found to have the improved porosity indicated by the present invention.

EXAMPLE VI

Crystalline polyethylene having a density of 0.96 and a melt index of 0.7 is melt extruded at 195° C. through a 4 inch diameter annular die having an opening of 0.04 inch. The hot tube thus formed is expanded 1.5 times by internal air pressure and cooled by an air stream impinging on the film from an air ring located around and above the die. The extrusion is accomplished with an extruder of 24:1 length to diameter ratio and a shallow channel metering screw. The extrudate is drawn down to a drawdown ratio of 100:1 and passed through a series of rollers which collapses the tube. After wind-up the film is oven annealed in a tensionless state at 115° C. for 16 hours.

After removal from the oven, the film is allowed to cool, and stretched at an extension ratio of 0.80, to 0.80, to 50 percent of its original length with cold stretching being conducted at −40° C. and hot stretching being conducted at 115° C., and heat set in the oven at constant length for 5 minutes at 120° C., after which it is found to have the porous structure of the present invention.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A process for making an open-celled microporous polymer film wherein said polymer is selected from polyolefins, polyacetals, polyamides, polyesters, polyalkylene sulfides and polyarylene oxides having an improved porosity, an improved thermal stability, a reduced bulk density and a pore size less than 5,000 angstroms, which process comprises cold stretching a nonporous, crystalline elastic film at a temperature below 0° C. until porous surface regions perpendicular to the stretch direction are formed, the nonporous elastic film having a crystallinity of above 20 percent, and an elastic recovery from a 50 percent strain of at least 40 percent at 25° C., hot stretching the resulting cold stretched film between the temperature at which melting of the polymer begins and the temperature at which polymer fusion occurs until pore spaces elongated parallel to the stretch direction are formed, and thereafter heating the resulting microporous film at a temperature of about 75° C. to about less than the fusion temperature of the polymer under tension wherein the total amount of stretching in said cold stretching and said hot stretching steps is in the range of about 10 to about 300 percent of the initial length of the film.

2. The process of claim 1 wherein the cold stretching and the hot stretching are conducted at an extension ratio between about 0.10:1 and 0.99:1.

3. The process of claim 2 wherein the film is a polypropylene film which is cold stretched at a temperature between −10° C. and −40° C.

4. The process of claim 2 wherein the film is an oxymethylene polymer film which is cold stretched at a temperature between −10° C. and −40° C.

5. The process of claim 2 wherein the film is a polyethylene film which is cold stretched at a temperature between −10° C. and −40° C.

6. A process for making an open-celled microporous polypropylene film having an improved porosity, an improved thermal stability, a reduced bulk density compared to the bulk density of a corresponding polypropylene film having no open-celled structure, and a pore size of less than 5,000 angstroms, which process comprises cold stretching a nonporous, crystalline, elastic polypropylene film at a temperature between −10° C. and −40° C., the elastic film having an initial crystallinity of at least 30 percent, and an initial elastic recovery from a 50 percent strain of at least 50 percent at 25° C.

hot stretching the resulting cold stretched film above 120° C. and below the fusion temperature of the cold stretched film, and at an extension ratio between 0.50:1 and 0.97:1;

and thereafter heating the resulting stretched film at substantially constant length at a temperature between about 130° C. and 150° C.

wherein the total amount of stretching in said cold stretching and said hot stretching steps is in the range of about 10 to about 300 percent of the initial length of the film.

7. A process for making an open-celled microporous polypropylene film having an improved porosity, an improved thermal stability, and a reduced bulk density compared to the bulk density or corresponding polypropylene film having no open-celled structure and a pore size less than 5000 angstroms, which process comprises cold stretching at a temperature between −10° C. and −20° C. a nonporous, crystalline, elastic, polypropylene film to develop porous surface regions perpendicular to the stretch direction, the elastic polypropylene film having an initial crystallinity of at least 30 percent and an initial elastic recovery from a 50 percent strain of at least 50 percent at 25° C., hot stretching, the resulting unrelaxed cold stretched film at a temperature between 130° C. and 150° C. to a total stretch of 10 to 300 percent of the original length of the elastic film and at an extension ratio between 0.50:1 and 0.97:1 to develop pore spaces elongated parallel to the stretch direction, the cold stretching and the hot stretching being conducted in the same stretch direction, and thereafter heating the resulting microporous film at substantially constant length at a temperature between about 130° C. and 150° C.

8. A process for making an open-celled microporous oxymethylene polymer film having an improved porosity, a reduced bulk density compared to the bulk density of corresponding polymer films having no open-celled structure, and a pore size less than 5,000 angstroms, which process comprises:

melt extruding at a temperature between 185° C. and 235° C. a film-forming oxymethylene polymer having a molecular weight of at least 10,000;

taking up the extruded film at a drawdown ratio between 20:1 and 200:1;

heating the as-extruded film at a temperature between 110° C. and 165° C. for about 5 seconds to 24 hours to improve the crystal structure of the film;

cold stretching the resulting film at a temperature below 0° C. until porous surface regions perpendicular to the stretch direction are formed;

hot stretching the resulting cold stretched film between the temperature at which melting of the polymer begins and the temperature at which polymer fusion occurs at an extension ratio between about 0.50:1 and 0.97:1 to a total stretch of 10 to 300 percent of its as-extruded length until pore spaces elongated parallel to the stretch direction are formed, and thereafter heating the resulting stretched film at substantially constant length at a temperature between 140° C. and 160° C.

9. A process for making an open-celled microporous polyethylene film having an improved porosity, a reduced bulk density compared to the bulk density of corresponding polymer films having no open-celled structure, and a pore size less than 5000 angstroms, which process comprises:

melt extruding a film-forming polyethylene;

taking up the extruded film at a drawdown ratio between 20:1 and 200:1;

cold stretching the as-extruded film at a temperature below 0° C.;

hot stretching the resulting cold-stretched film at an extension ratio between about 0.50:1 and 0.97:1 to a total stretch of 10 to 300 percent of its as-extruded length and at a temperature above 120° C. and below the fusion temperature, and thereafter heating the resulting stretched film at substantially constant length and at a temperature between 100° C. and 130° C.

References Cited

UNITED STATES PATENTS

| | | | |
|---|---|---|---|
| 3,102,323 | 9/1963 | Adams | 260—40 |
| 3,558,764 | 1/1971 | Isaacson et al. | 264—210 Z |
| 3,117,173 | 1/1964 | Adams | 264—290 T |
| 3,215,486 | 11/1965 | Hada et al. | 8—74 |
| 3,233,019 | 2/1966 | Adams | 264—210 Z |
| 3,247,300 | 4/1966 | Stump | 264—290 Z |
| 3,426,754 | 2/1969 | Brevenbaum et al. | 128—156 |
| 3,513,110 | 5/1970 | Noether | 260—2.5 E |

JAY H. WOO, Primary Examiner

U.S. Cl. X.R.

264—235, 288